June 4, 1929.　　D. MAROSY　　1,716,143
WATER OPERATED MASSAGING DEVICE
Filed Feb. 1, 1928
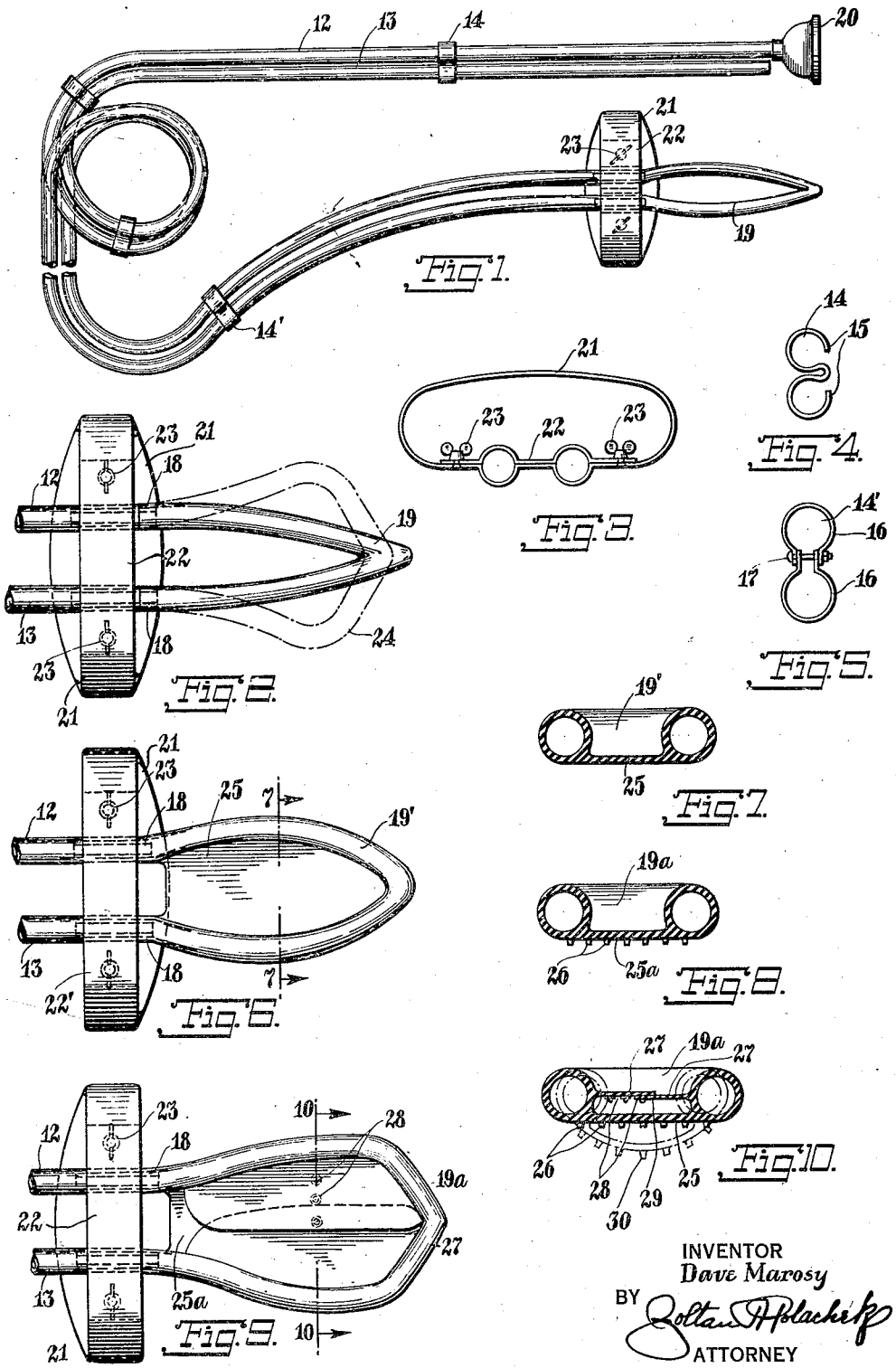

Patented June 4, 1929.

1,716,143

UNITED STATES PATENT OFFICE.

DAVE MAROSY, OF NEW YORK, N. Y.

WATER-OPERATED MASSAGING DEVICE.

Application filed February 1, 1928. Serial No. 250,964.

This invention relates generally to massaging devices, and has more particular reference to a vibration type of massage device.

The invention has for an object the provision of a device of the class mentioned, which is of simple durable construction, desirable and efficient in action, and which can be manufactured and sold at a reasonable cost.

Hydraulic power is used to set up the vibrations of the device which consists of a pair of flexible tubes joined at one of their ends by a substantially U-shaped vibration tube. The free end of one of the tubes of the said pair of tubes is provided with a coupling device adapted for connection with a water faucet, and the free end of the other tube serves as an exhaust. Joiner brackets are connected along the lengths of the pair of tubes to keep them in close proximity to each other. A hand support bracket is connected to the pair of tubes at the ends adjacent the vibration tube, so that the vibration tube may be readily used for massaging.

For further comprehension of the invention, and of the objects and advantages thereof, reference will be had to the following description and accompanying drawings, and to the appended claims in which the various novel features of the invention are more particularly set forth.

Referring to the accompanying drawing, forming a material part of this disclosure:—

Fig. 1 is a plan view of a device as mentioned.

Fig. 2 is an enlarged detailed fragmentary view thereof.

Fig. 3 is an end view of the hand support bracket of the device.

Fig. 4 is an end view of a joiner bracket of the device.

Fig. 5 is an end view of a joiner bracket of modified form.

Fig. 6 is a view similar to Fig. 2, but illustrating a modified form thereof.

Fig. 7 is a transverse vertical sectional view, taken on the line 7—7 of Fig. 6.

Fig. 8 is a view similar to Fig. 7 but illustrating a modified form thereof.

Fig. 9 is a view similar to Fig. 6, but illustrating a modified form thereof.

Fig. 10 is a transverse vertical sectional view, taken on the line 10—10 of Fig. 9.

The reference numerals 12 and 13 indicate generally a pair of flexible pipes held in longitudinal proximity to each other by joiner brackets 14 and 14'. The brackets 14 are made from one integral piece of metal formed so as to have tube encircling arms 15. The brackets 14' have tube encircling arms 16 connected by bolts 17.

One of the ends of the pipes 12 and 13 have small tubes 18 forced therein and projecting slightly therefrom. A substantially U-shaped flexible vibration tube 19 has its ends forced upon the tubes 18. A coupling device 20 is attached to the other end of the tube 12, and is adapted for connection to a water faucet.

A hand support bracket 21 is attached to the pair of pipes at the ends adjacent the vibration tube, by means of a clamp member 22 secured to the bracket 21 by wing nuts 23.

In operation coupling 20 is connected to a faucet and the water is turned on. The water passes thru pipe 12 to member 19, and then thru the member 19 to pipe 13, and at the end of this pipe the water exhausts into a sink or other suitable place. The stream of water passing thru the device must be very swift and rapid, and as the stream is forced to bend, or turn around the bend of the U-member 19, commotion results which causes the U-member to vibrate. The rapid stream of water also changes the shape of the U-member 19 to a shape indicated by the dot dash lines 24. The operator of the device inserts his hand into the hand support bracket 21, and then does massaging with the vibration member 19.

In the modified form shown in Figs. 6 and 7, the vibration member 19' is provided with an integral bottom web 25 so that a larger surface for massaging is presented.

In Fig. 8 the vibration member 19ª has a bottom web 25ª formed with a plurality of projections 26 simulating bristles.

In Figs. 9 and 10 the vibration member 19ª has a pair of integral flaps 27 directed towards each other from opposite inner sides of the arms of the U-shaped member 19ª. One of the flaps has several male snap fastener members 28 secured to its lower side and in a straight row, and the other flap has a complementary snap fastener member 29 coactable with the members 28, as a means for changing the size of the bend of the U-member 19ª, and thus varying the vibration qualities. The web 25 assumes a curved position in certain adjustments of the U-member, as indicated by dot dash lines 30.

While I have shown and described a preferred embodiment of my invention, it is to be understood that I do not limit myself to the precise construction herein disclosed and the right is reserved to all changes and modifications coming within the scope of the invention as defined in the appended claims.

Having thus described my invention what I claim as new and desire to secure by United States Letters Patent is:—

1. A device of the class described, comprising a pair of pipes, joiner brackets connected along the lengths thereof for holding the pipes in close proximity to each other, stiff tubes forced into each of the pipes at one of the ends thereof, a U-shaped flexible vibration pipe forced upon the projecting ends of the said tubes, and a hand support bracket connected to the ends of the tubes adjacent the vibration pipe.

2. A device of the class described, comprising a pair of pipes, stiff tubes forced into each of the pipes at one of the ends thereof, a U-shaped flexible vibration pipe forced upon the projecting ends of the said tubes, one of the ends of said pair of pipes being arranged for receiving a faucet coupling, and a hand support bracket connected to the ends of the tubes adjacent the vibration pipe.

3. In a device of the class described, a vibration member comprising a substantially U-shaped flexible pipe, and a web joining the arms thereof on one of the sides of the U-member.

4. In a device of the class described, a vibration member, comprising a substantially U-shaped flexible pipe, a web joining the arms thereof on one of the sides of the U-member, and projections from the web simulating bristles, a pair of flaps directed towards each other from opposite inner sides of the arms of the U-shaped member, and means for holding these flaps in adjusted relative positions, as a means for changing the size of the bend of the U-member.

In testimony whereof I have affixed my signature.

DAVE MAROSY.